United States Patent Office 2,909,241
Patented Oct. 20, 1959

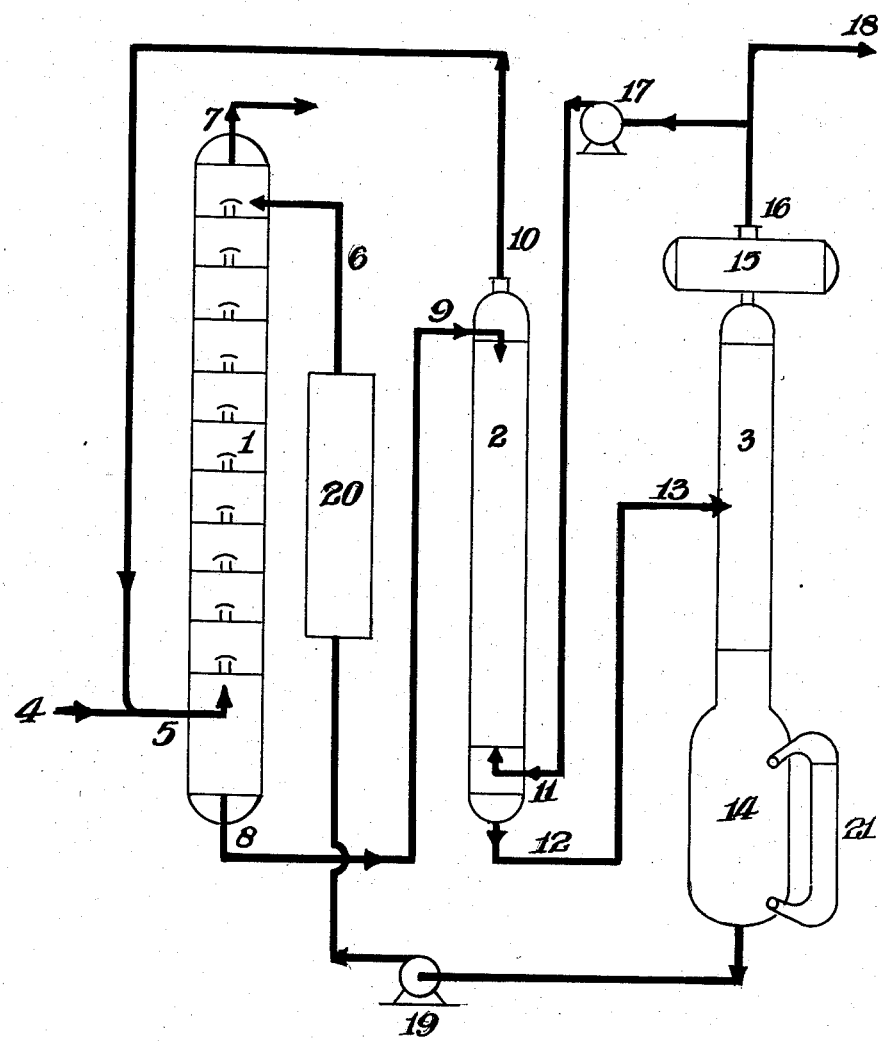

2,909,241
PROCESS FOR SEPARATING PURE ACETYLENE FROM GAS MIXTURES CONTAINING ACETYLENE

Günter Rummert, Burghausen, Upper Bavaria, Germany, assignor to Farbwerke Hoechst Aktiengesellschaft vormals Meister Lucius & Brüning, Frankfurt am Main, Germany, a corporation of Germany Application September 24, 1957, Serial No. 685,913
Claims priority, application Germany September 25, 1956
16 Claims. (Cl. 183—115)

This invention relates to a process for the separation of pure acetylene from gases obtained by the pyrolysis of hydrocarbons.

It is known that gases containing appreciable quantities of acetylene can be obtained by the pyrolysis of petroleum hydrocarbons. All these processes would be economically much superior to the carbide acetylene process if it would be possible to find a simple and inexpensive way of obtaining the acetylene which is present but in a low concentration in these gases (8 to 20 percent by volume). The carbide process is, however, in general a serious economic rival of all petrochemical processes because it immediately yields a high-percent acetylene which hardly requires further purification whereas in all processes by pyrolysis the expenses for the concentration and separation of acetylene from the gases obtained by pyrolysis constitute the major portion of the total cost. Particular difficulties arise when the said gases do not only contain acetylene but also considerable quantities of ethylene.

All selective solvents that are hitherto known are suitable for separating acetylene from the light constituents of the gases obtained by pyrolysis, such as carbon monoxide, hydrogen, methane, and nitrogen. They are, however, ineffective when the gas not only contains acetylene but also ethylene. It is also known that acetylene is soluble in dimethyl sulfoxide

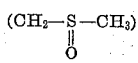

Now I have found that liquid mixtures of dimethyl sulfoxide and 1,4-thioxane-S-oxide of the formula

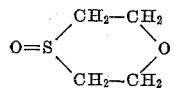

are capable of selectively separating pure acetylene from acetylene-containing gas mixtures and more especially from gases obtained by the pyrolysis of hydrocarbons. The dissolving capacity of these mixtures is particularly good in a temperature range of between the melting point and about 30° C. These mixtures have an excellent capacity of selectively dissolving acetylene even from its mixtures with ethylene. It is particularly surprising that the selectivity of the solubility of acetylene increases with decreasing temperature. The acetylene can be much better separated from the ethylene in this way than by means of pure substances.

While, for example, 28 parts by volume of acetylene and 1 part by volume of ethylene are dissolved at +20° C. and under atmospheric pressure in dimethyl sulfoxide (which has a melting point of +18° C.) and while 17 parts by volume of acetylene and 1 part by volume of ethylene are dissolved at 42° C. and under atmospheric pressure in 1,4-thioxane-S-oxide (which has a melting point of +39° C.), the mixtures of dimethyl sulfoxide and 1,4-thioxane-S-oxide have the unexpected property that either of the components intensifies the action of the other. Thus, in the eutectic mixture consisting of 60 parts by weight of dimethyl sulfoxide and 40 parts by weight of 1,4-thioxane-S-oxide the melting point of which is —2° C., only 1 part by volume of ethylene and 39 parts by volume of acetylene are dissolved at 0° C. and under atmospheric pressure. The process according to the present invention has the further advantage that the amount of acetylene dissolved in the liquid mixtures in considerably greater than the amount of acetylene dissolved in the pure liquid substances. Consequently, the quantity of solvent required to separate a certain amount of acetylene under the same pressure is considerably smaller in this case than with the use of pure substances. The increased capacity of dissolving acetylene and a selectivity which is improved with decreasing temperature cannot be obtained by incorporating with the dimethyl sulfoxide substances which effect a lower melting point. Thus, the absolute absorbing power and the selectivity with regard to the separation of acetylene and ethylene are considerably diminished when the melting point of dimethyl sulfoxide is reduced by the addition of water.

The combination of solvents according to the present invention thus enables acetylene to be separated in a very economical way from gas mixtures containing acetylene and ethylene. The present invention is especially appropriate for the separation of acetylene from gases obtained by the pyrolysis of hydrocarbons or even from mixtures of gases obtained by pyrolysis and in which the acetylene has already been concentrated, for example, by way of a Linde-distillation. The absorption is advantageously carried out at normal or moderately elevated pressure and at a temperature of between 0 and 30° C. by means of a mixture containing about 70 to 50 percent by weight of dimethyl sulfoxide and about 30 to 50 percent by weight of 1,4-thioxane-S-oxide. The pressure is suitably chosen so as to prevent the partial pressure of the acetylene from exceeding 1.5 atmospheres (gauge). The process may, for example, be carried out in a column provided with several trays, the gas obtained by pyrolysis being conveyed from the bottom toward the top and a mixture of dimethyl sulfoxide and 1,4-thioxane-S-oxide being trickled over the column. The acetylene absorbed in the solvent can subsequently be separated, the separation being preferably effected under normal pressure or in vacuo at a temperature of between 70 and 170° C. The acetylene thus obtained has a purity of 93 to 97%. To remove, if necessary, the last contaminations the solvent saturated with acetylene may be attacked with high-percent or pure acetylene before the boiling out. The inert gases are thus selectively separated and the acetylene thus obtained has a purity of 98.5 to 99.5 percent by volume. If desired, the gases obtained by pyrolysis may be freed in known manner and prior to the absorption from carbon dioxide, sulfur compounds, such as $H_2S$, and other contaminations. It is of advantage to exclude all processes which might cause a loss of acetylene, such as, for example, hydraulic washing. There may, however, be applied, for example, a washing with a potash solution, with an amino alcohol (girbotol process), with a sodium hydroxide solution or a caustic potash solution. It is also possible to wash with solutions of salts of amino acids. Such a preliminary purification may, however, be dispensed with since neither $CO_2$ nor $H_2S$ are dissolved to a considerable extent in the mixture of solvents proposed by the present invention and they consequently remain in the residual gas. Whether a preliminary purification is to be carried out or not depends on the manner in which the residual gas remaining behind after the removal of the acetylene is to be worked up and utilized.

An apparatus suitable for use in carrying out the process of this invention is illustrated diagrammatically in the accompanying drawing. Referring to the drawing the numerals designate the following parts: The apparatus comprises an absorption column 1, a so-called stripping column 2 and a boiling column 3.

The crude gas which, if desired, has previously been freed from carbon dioxide and sulfur compounds enters the absorption column 1 at 5 via a conduit 4.

After being boiled out, the solvent enters the upper part of the column at 6 and trickles over it. The residual gas that has not been absorbed and which is to a large extent free from acetylene leaves at the top of the column at 7. The solvent mixture charged with acetylene leaves the sump of the absorption column at 8 and is then fed at 9 to the head of the stripping column 2. In this column acetylene gas that has already been brought to a higher degree of concentration rises from below (11) thus being conducted in counter-current to the solvent mixture, and expels the inert gases which have also been dissolved, at 10 from where they are conducted to 5 where they are again admixed with the current of crude gas.

The solvent which is to a high degree freed from inert gases and which at this point of the process contains very pure dissolved acetylene leaves the sump of the stripping column at 12 and enters the boiling column 3 at 13. The sump 14 of the boiling column is heated to 170° C. by means of an appropriate heating device, for example a steam heated circulation evaporator 21, while the head of the column is cooled by means of a cooling device 15 in order to avoid losses of solvents. The pure acetylene gas leaves the cooling device at 16. Part of the pure acetylene gas is returned into the stripping column 2 at 11 via a blast 17, the rest of it being drawn off at 18.

The degassed solvent is drawn from the sump 14 of the boiling column by means of the pump 19, then cooled off in the cooling device 20 and again caused to trickle over the absorption column at 6.

If it is not necessary to obtain an acetylene of an extremely high degree of purity, the stripping column 2 may be dispensed with. In this case the solvent saturated with acetylene is drawn off at 8 from the sump of the absorption column and directly conveyed into the boiling column at 13.

The following examples serve to illustrate the invention but they are not intended to limit it thereto, the parts being by weight.

Example 1

At a temperature of 0° C. and under a pressure of 1 atmosphere absolute, 20 Nm.$^3$ of a gas of composition A obtained by the pyrolysis of hydrocarbons and freed by a preliminary purification from carbon dioxide and sulfur compounds were conducted from the bottom toward the top of a column provided with 5 trays. 1 m.$^3$ per hour of a eutectic mixture consisting of 60 parts of dimethyl sulfoxide and 40 parts of 1,4-thioxane-S-oxide trickled over the column. The residual gas which had not been absorbed (17.2 Nm.$^3$ per hour) was of composition B. The solvent which left the sump of the washing column and which was saturated with acetylene was boiled at 170° C. and yielded an acetylene gas (2.8 Nm.$^3$ per hour) having composition C.

|  | A (20 Nm.$^3$/h.) percent by volume | B (17.2 Nm.$^3$/h.) percent by volume | C (2.8 Nm.$^3$/h.) percent by volume |
| --- | --- | --- | --- |
| Acetylene | 14.2 | 0.5 | 93.8 |
| Ethylene | 7.6 | 8.5 | 4.6 |
| Oxygen | 0.2 | 0.1 | 0.2 |
| Methane | 11.4 | 13.4 | 1.4 |
| Carbon Monoxide | 7.8 | 9.4 | |
| Hydrogen | 54.0 | 63.3 | |
| Nitrogen | 4.8 | 4.8 | |
|  | 100.0 | 100.0 | 100.0 |

Example 2

The same apparatus as that used in Example 1 was charged with 38 Nm.$^3$ of gas per hour, the quantity of solvent (1 m.$^3$ per hour) and the absorption and desorption temperatures being the same as in Example 1.

The quantity of the residual gas that had not been absorbed amounted to 33 Nm.$^3$ per hour while 5 Nm.$^3$ per hour of acetylene could be boiled out from the sump of the column.

The gases had the following composition, the parts being by volume:

| Total quantity | Gas introduced—38 Nm.$^3$ per hour | Residual gas—not absorbed (ethylene gas) 33 Nm.$^3$ per hour | Acetylene gas—from the boiling column, 5 Nm.$^3$ per hour |
| --- | --- | --- | --- |
| Acetylene | 13.8 | 1.6 | 96.6 |
| Ethylene | 7.6 | 8.2 | 2.3 |
| Oxygen | 0.2 |  | 0.1 |
| Carbon monoxide | 8.0 | 8.8 | 0.2 |
| Hydrogen | 53.6 | 62.7 | 0.1 |
| Methane | 11.3 | 13.4 | 0.5 |
| Nitrogen | 5.5 | 5.3 | 0.2 |
|  | 100.0 | 100.0 | 100.0 |

To obtain an acetylene free from contaminations a further experiment was carried out wherein the solvent saturated with acetylene which was discharged from the sump was, prior to the boiling out, continuously attacked with 600 l. per hour of reconveyed acetylene gas and thus freed from contaminations.

The expelled gas issuing at the top of the column was returned into the washing column together with the crude gas. The saturated solvent was then boiled. In this manner an acetylene of a purity of 98.5 percent by volume was obtained.

Example 3

In the same apparatus as that used in the preceding examples 36 Nm.$^3$ per hour of a gas obtained by pyrolysis of hydrocarbons and having composition A were washed at 0° C. and under a pressure of 1 atmosphere absolute with 1 m.$^3$ of a mixture consisting of 60 parts of dimethyl sulfoxide and 40 parts of 1,4-thioxane-S-oxide. 32.8 Nm.$^3$ per hour of a residual gas of composition B which had not been absorbed issued at the top of the column.

|  | A (36 Nm.$^3$/h.) percent by vol. | B (32.8 Nm.$^3$/h.) percent by vol. | C (3.13 Nm.$^3$/h.) percent by vol. | D Percent by vol. |
| --- | --- | --- | --- | --- |
| Acetylene | 8.6 | 0.2 | 97.4 | 99.5 |
| Ethylene | 2.0 | 2.4 | 0.6 | 0.3 |
| Carbon monoxide | 4.2 | 4.5 |  |  |
| Hydrogen | 62.4 | 68.5 | 0.4 |  |
| Methane | 20.6 | 22.0 | 1.0 | 0.2 |
| Nitrogen | 2.2 | 2.4 | 0.6 |  |
|  | 100.0 | 100.0 | 100.0 | 100.0 |

The saturated solvent flowing off from the sump of the column was continuously introduced into a boiling column heated to 170° C., in which the acetylene was set free. The acetylene gas (3.13 Nm.$^3$ per hour) was of composition C. When 2 Nm.$^3$ per hour of impure acetylene of composition C were conveyed by means of a pump from the bottom toward the top of a stripping column which had been interposed and when the saturated solvent leaving the sump of the absorption column was trickled over the stripping column the predominant part of the foreign gases that had also been dissolved was set free and left at the top of the stripping column. These gases which left at the top of the column were re-admixed with the crude gas entering the absorption column. The solvent was then extracted by boiling in known manner. After adjustment of the equilibrium an acetylene of composition D was obtained.

I claim:

1. A solution of acetylene in a liquid mixture of dimethylsulfoxide and 1,4-thioxane —S— oxide.

2. A solution of acetylene in a liquid mixture of about 50 to 70 percent by weight of dimethyl sulfoxide and about 50 to 30 percent by weight of 1,4-thioxane —S— oxide.

3. A solution of acetylene in a liquid mixture of about 60 percent by weight of dimethyl sulfoxide and about 40 percent by weight of 1,4-thioxane —S— oxide.

4. A process for separating acetylene from its mixture with a gas selected from the group consisting of ethylene, methane, oxygen, carbon monoxide, hydrogen, nitrogen and combinations thereof which comprises contacting said mixture with a liquid mixture of dimethyl sulfoxide and 1,4-thioxane-S-oxide.

5. The process of claim 4 wherein the contacting is carried out at a temperature up to about 30° C.

6. The process of claim 5 wherein the liquid mixture comprises about 50 to 70% by weight of dimethyl sulfoxide and about 50 to 30% by weight of 1,4-thioxane-S-oxide.

7. The process of claim 4 wherein the partial pressure of acetylene is at most 1.5 atmospheres, gauge pressure.

8. The process of claim 7 wherein the gas mixture is conducted countercurrent to the liquid mixture of dimethyl sulfoxide and 1,4-thioxane-S-oxide.

9. A process of claim 7 wherein the mixture contains ethylene.

10. The process of claim 4 wherein the partial pressure of acetylene is at most 1.5 atmospheres, gauge pressure.

11. A process for purifying acetylene which comprises contacting a mixture of acetylene with a gas selected from the group consisting of ethylene, methane, oxygen, carbon monoxide, hydrogen, nitrogen and combinations thereof at a temperature up to about 30° C. with a liquid mixture of dimethyl sulfoxide and 1,4-thioxane-S-oxide and subsequently degassing the acetylene from the liquid mixture at a temperature in the range from about 70° C. to about 170° C.

12. The process of claim 11 wherein the acetylene is degassed from the liquid mixture at a pressure not exceeding atmospheric pressure.

13. The process of claim 12 wherein the gas mixture is contacted at a temperature from about 0 to 30° C. with a liquid mixture of about 50 to 70% by weight of dimethyl sulfoxide and about 50 to 30% by weight of 1,4-thioxane-S-oxide and the major part of gas other than acetylene is removed from the liquid mixture by treating said solution of acetylene in the liquid mixture with substantially pure gaseous acetylene.

14. A process of claim 4 wherein the mixture contains ethylene.

15. The process for separating acetylene from gases obtained by pyrolysis of hydrocarbons which comprises contacting said gases with a liquid mixture of dimethyl sulfoxide and 1,4-thioxane-S-oxide.

16. The process of claim 15 wherein the liquid mixture comprises about 50 to 70% by weight of dimethyl sulfoxide and about 50 to 30% by weight of 1,4-thioxane-S-oxide.

References Cited in the file of this patent

UNITED STATES PATENTS 2,715,100    Christian    Aug. 9, 1955